United States Patent [19]

Carascon et al.

[11] 4,352,604
[45] Oct. 5, 1982

[54] FEEDING DEVICE FOR CIGARETTE FILTERS AND SIMILAR RODS

[75] Inventors: Walter Carascon; Derek H. Dyett; Grantley R. Hoath, all of High Wycombe Bucks, England

[73] Assignee: Molins Limited, London, England

[21] Appl. No.: 137,970

[22] Filed: Apr. 7, 1980

[30] Foreign Application Priority Data

Apr. 5, 1979 [GB] United Kingdom ............... 7912043

[51] Int. Cl.³ .................... B65G 51/02; B65G 37/00
[52] U.S. Cl. .................................. 406/28; 131/282; 198/347; 198/573; 406/82; 493/29
[58] Field of Search ............ 198/347, 544, 547, 572, 198/573; 406/28, 33, 82; 131/21 R, 21 A, 21 C, 23 R, 25, 282; 493/4, 29, 39

[56] References Cited

U.S. PATENT DOCUMENTS 3,305,128  2/1967  Dearsley ..................... 198/347 X
3,967,858  7/1976  Atwell et al. ................. 198/347 X
4,200,181  4/1980  Clarke ............................ 198/572

FOREIGN PATENT DOCUMENTS 2716391  11/1977  Fed. Rep. of Germany .
1093261  11/1967  United Kingdom .
1284873   8/1972  United Kingdom ............... 198/572
1561560   2/1980  United Kingdom .

Primary Examiner—Jeffrey V. Nase
Attorney, Agent, or Firm—Antonelli, Terry & Wands

[57] ABSTRACT

A device for feeding cigarette filters or similar rod-like articles comprises a fluted drum and a conveyor for feeding a stack-like stream of filters towards the drum and including a conveyor band which is arranged to engage one side of the stack-like stream of filters while moving between two longitudinally spaced guides between which the conveyor is capable of deflecting outwards, in response to the pressure of the filters and against a restraining force, to accommodate a variable quantity of filters in the region of the conveyor band.

7 Claims, 4 Drawing Figures

FEEDING DEVICE FOR CIGARETTE FILTERS AND SIMILAR RODS

This invention is concerned with feeding filters and similar rods of the cigarette industry into flutes of a fluted drum from a mass of rods. In filter attachment machines, filter rods are commonly fed onto a fluted drum from a hopper above the drum. An example of such a filter attachment machine is shown in British patent specification No. 1179683.

British Patent Application No. 14940/76 (and corresponding published German application No. 2716391) describes, amongst other things, an arrangement for feeding rods (double filter cigarette units in that instance) onto a fluted drum as a stack-like stream carried towards the drum by a conveyor with means for controlling the movement of the conveyor to feed the rods in an appropriately controlled manner. The present invention is concerned with improvements over that arrangement, particularly for use in feeding cigarette filter rods onto a fluted drum in a filter attachment machine.

According to the present invention, a device for feeding cigarette filters or similar rods comprises a fluted drum and a conveyor for feeding a stack-like stream of filters towards the drum and including a conveyor band which is arranged to engage one side of the stack-like stream of filters while moving between two longitudinally spaced guides between which the conveyor band is capable of deflecting outwards, in response to the pressure of the of the filters and against a restraining force, to accomodate a variable quantity of filters in the region of the conveyor band.

The guides may comprises pulleys around which the conveyor band is arranged to pass. The restraining force is preferably produced by a tensioning device for the conveyor band. There are preferably means for detecting when the conveyor band is deflected outwards to a predetermined extent and for thereupon stopping or slowing down the conveyor; deflection of the conveyor band may be indicated by movement of the tensioning device.

The conveyor may be driven by a constant-torque motor.

Examples of rod-feeding devices according to this invention are shown in the accompanying drawings.

Figure 1:
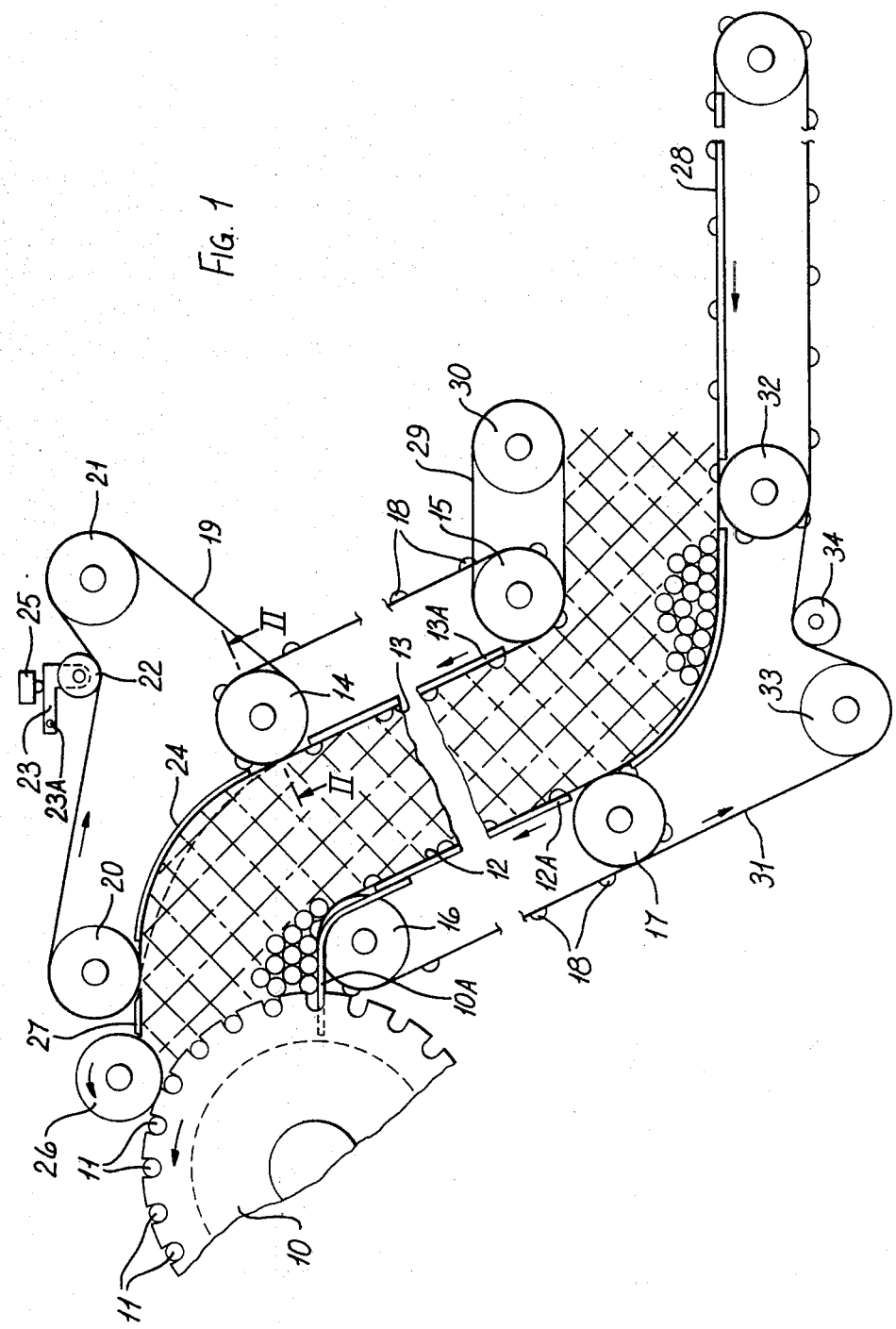
FIG. 1 is a diagrammatic elevation of one device.

In the device shown in FIG. 1, a fluted drum 10 is arranged to receive a filter rod 11 in each of its flutes. The rods are subsequently cut and then joined to tobacco rods to form filter tipped cigarettes, e.g. in the manner employed in the Molins PA8 filter attachment machine.

A conveyor comprising two opposed parallel conveyor bands 12 and 13, backed by plates 12A and 13A, conveys a stack-like stream of the filter rods in a generally upward direction towards the drum 10. Each of the bands 12 and 13 is somewhat in the form of a timing belt, i.e. having driving teeth (e.g. 13B) whereby it can be positively driven by corresponding teeth on the pulleys supporting the band; such pulleys for the band 13 are pulleys 14 and 15, while the band 12 has pulleys 16 and 17. In addition each band is formed with rounded ribs 18 extending across the band at regular intervals to assist in driving the rods upwards, each rib having approximately the same diameter as the rods 11.

Figure 2:
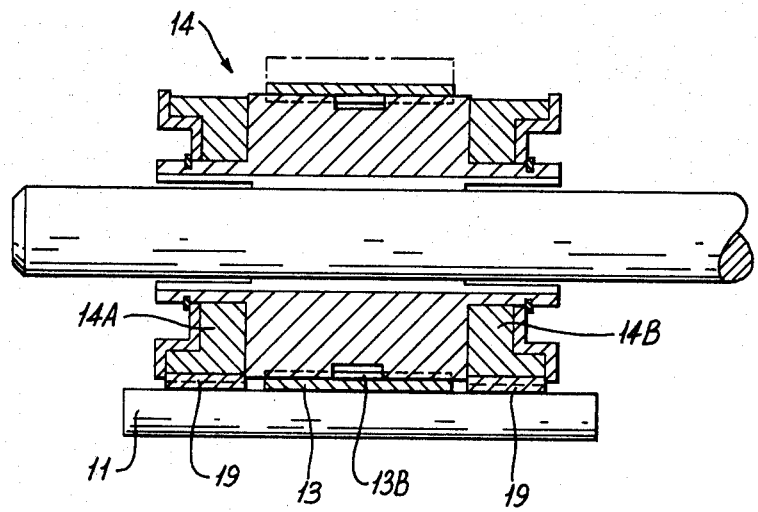
FIG. 2 is a section on the line II—II in FIG. 1, enlarged to show further details.

It should be noted that the stack-like stream of rods is conveyed towards the drum 10 by the conveyor 12, 13 in approximately a tangential direction and is then deflected towards the drum by a pair of bands 19. These bands are shown diagrammatically in FIG. 1 and in fact comprise narrow timing belts having teeth whereby they are positively driven at a slightly higher speed than the bands 12 and 13. As shown in FIG. 2, the bands 19 pass around end portions 14A, 14B of the pulley 14 and bear on the rods 11 near their ends. That is to say, the bands 11 are both laterally offset from the band 13. In addition, the bands 19 pass around pulleys 20 and 21 and are engaged by a gravity-loaded or spring-loaded tensioning pulley 22. This last pulley is carried by a member 23 pivoted at 23A.

In the area adjacent to the drum 10, the ribs 18 on the conveyor 12 are held out of engagement with the filter rods by fixed plates 10A which extend respectively across the ends of the pulley 16 and into circumferential grooves in the drum 10.

When the pressure of the rods on the part of the bands 19 engaging the rods is sufficient to deflect the bands outwards into contact with a curved backing plate 24, the roller 22 is lifted to a position in which the carrier member 23 engages a microswitch 25 which automatically reduces the speed at which the bands 12, 13 and bands 19 are driven. As soon as the carrier member 23 falls clear of the microswitch 25, the speed of the drive to the conveyors 12, 13 and bands 19 returns to normal.

As shown by the arrow in FIG. 1, the drum 10 rotates in a counter-clockwise direction. A refuser roller 26 ensures that no rods are carried from the stack by the drum 10, apart from those in flutes in the drum. Between the roller 26 and pulley 20 there is a short stationary bridge 27.

The stack-like stream of rods is delivered to the conveyor 12, 13 by a conveyor 28 upon which the rods may be delivered from trays and/or from a receiver unit of a pneumatic rod-conveying device such as the Molins APHIS. The thickness (height) of the stack-like stream as it approaches the conveyor 12, 13 is determined by narrow bands 29 passing around a pulley 30 and around the ends of the pulley 15 (as in the case of the bands 19 and pulley 14). Further narrow bands 31 lying on opposite sides of the conveyors 28 and 12 convey the stream of rods around the pulley 15. These bands 31 pass around the ends of the pulley 17, around the ends of a pulley 32 for the conveyor 28, and around a further pulley 33, and are lightly tensioned by a spring-loaded pulley 34.

The conveyor 28 and bands 31 are formed with driving teeth similar to those on the bands 12 and 13, while the conveyor 28 also has transverse ribs. The drive system may (in a manner known per se) be arranged to drive all the bands and conveyors in unison.

Figure 3:
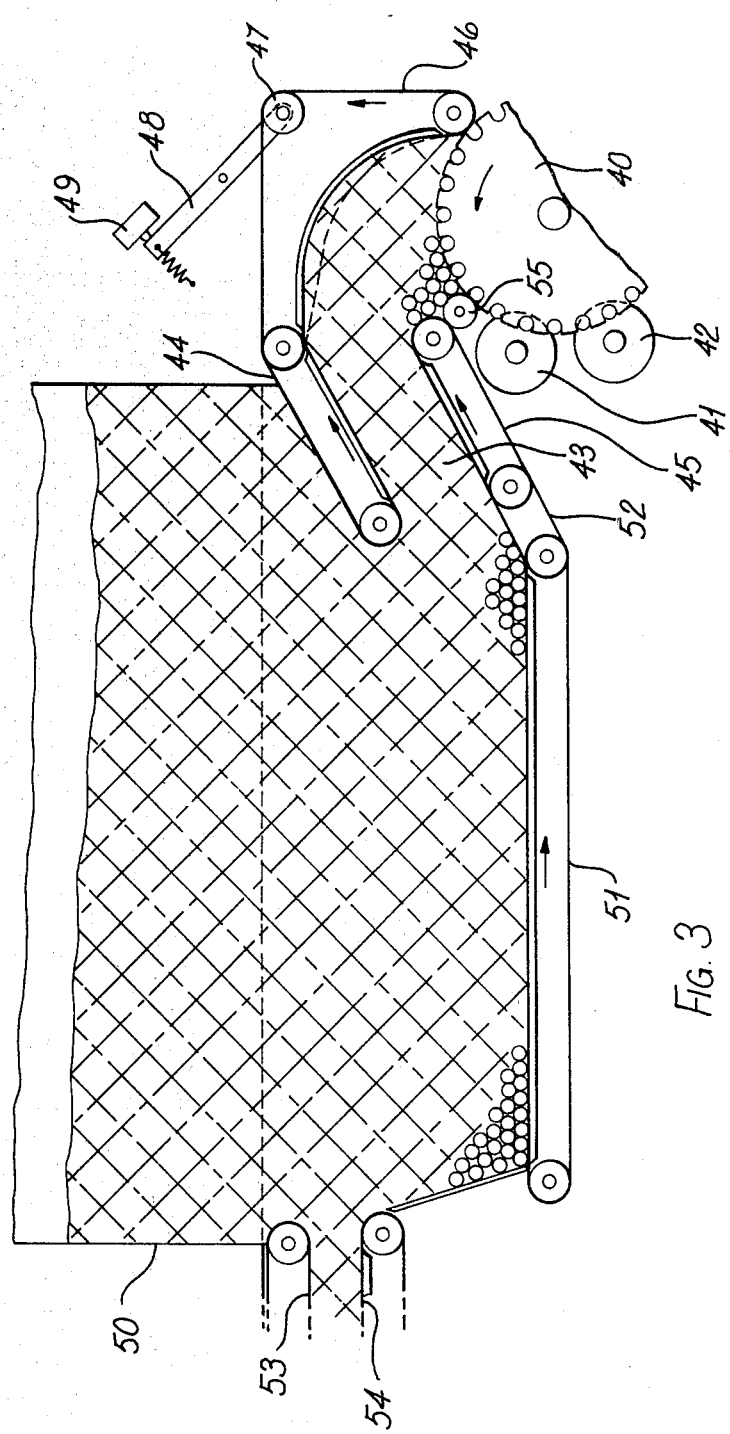
FIG. 3 is a diagrammatic elevation of a second device.

FIG. 3 shows a different form of device according to this invention. The device includes a fluted drum 40 similar to the drum 10 in FIG. 1, and in this example disc knives 41 and 42 are shown for cutting the rods into three portions each of which will be secured between two tobacco rods by a uniting band in the course of manufacture of filter-tipped cigarettes in a conventional manner.

A stack-like stream of filter rods 43 is conveyed approximately tangentially towards the drum by a conveyor comprising bands 44 and 45 which are similar to the bands 12 and 13 in FIG. 1. As in the FIG. 1 example, a sensor band 46 comprising two narrow portions extending on opposite sides of the conveyor 44 deflect the stack-like stream towards the drum 40, this time in a downward direction. A spring-loaded pulley 47 carried by a pivoted member 48 performs the same function as the roller 22 in FIG. 1; inward movement of the pulley 47 in response to increasing pressure of the rods on the operative portion of the bands 46 eventually causes the member 48 to operate a switch 49 which reduces the speed of the conveyors 44 and 45 and bands 46 or possibly brings their movement to a temporary stop.

FIG. 3 also shows a tray 50 in position to unload a batch of rods over a horizontal conveyor band 51 which is driven in unison with the bands 44, 45 and bands 46. Between the bands 51 and 45 there is a pair of narrow bands 52 lying on opposite sides of the conveyors 51 and 45 as in the previous example.

There is also provision for delivery of rods from a receiver of a pneumatic rod transport unit such as APHIS 2N. The receiver includes parallel conveyor bands 53 and 54 which deliver a relatively thin stack-like stream of rods into the space above the conveyor 51. For that purpose, the receiver may be as described in British Patent specification No. 1561560.

During normal operation, rods may be delivered from the pneumatic unit via conveyor 53, 54. However, if the pneumatic delivery unit fails, batches of rods may be delivered manually or automatically from a succession of trays in any conventional manner.

A refuser roller 55 is included for the reason mentioned in connection with FIG. 1.

Figure 4:
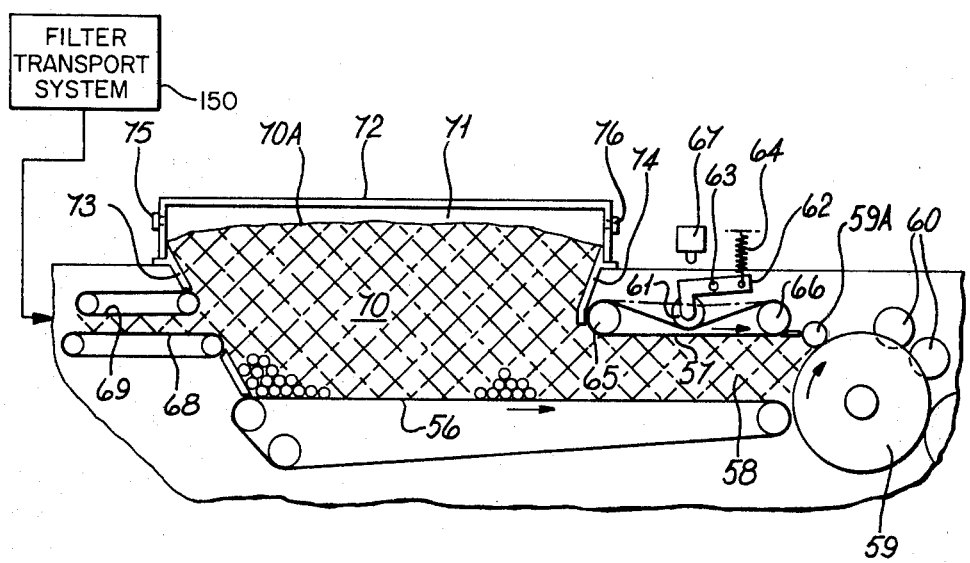
FIG. 4 is a diagrammatic elevation of a third device.

FIG. 4 shows diagrammatically a different arrangement in which a conveyor comprising a horizontal band 56 and a deflectable band 57 is arranged to convey a stack-like stream 58 of filter rods directly towards a fluted drum 59. Disc knives 60 and a refuser roller 59A are associated with the drum 59, as in the previous examples.

A tensioning roller 61 for the band 57 is carried by a lever 62 which is pivoted at 63, and is urged in a counterclockwise direction by a spring 64.

Upward pressure of the filters on the band 57 tends to deflect upwards the operative lower run of the band 57 passing between the guide pulleys 65 and 66. Such movement raises the roller 61; and when a limiting position is reached, the lever 62 operates a switch 67 which stops or slows down the motor driving the bands 56 and 57. Alternatively, the control arrangement may be such that the motor speed is reduced progressively as the roller 61 rises.

A pair of bands 68, 69 forming part of the receiver unit of a pneumatic transport system 150 (as mentioned above) delivers a relatively thin stack-like stream of filters to an area 70 above the upstream end of the conveyor band 56. The upper surface 70A of the filters in this area is free to expand into a space 71 within a cover 72 mounted on supports 73 and 74. A beam of light is directed horizontally by a source 75 towards a photocell 76. When the beam is interrupted by the filters, the pneumatic transport system 150 (including bands 68, 69) is automatically stopped; and it resumes operation when the beam once again reaches the photocell 76.

When the pneumatic transport system is out of action, the cover 72 can be moved off the supports 73, 74 to allow an inverted tray (or a succession of trays) to be put in its place to continue the supply of filters.

Instead of the conveyor 56, 57 being controlled by the upward deflection of the band 57, the conveyor may be driven by a constant-torque motor so that the stack 58 is driven towards the drum 59 with a substantially constant force regardless of the speed of the drum 59 (which would normally run slowly during the machine start-up sequence). A suitable motor is one which is capable of delivering a constant-torque drive over a speed range extending from zero to the desired maximum speed. For example, the motor may be a printed circuit DC motor; one suitable commercially available example is the ITT Heyneau motor. Alternatively it is possible to use a shunt-wound motor with a constant field (through a permanent magnet) which is fed with a constant current.

In conjunction with a constant-torque motor, the operative lower run of the band 57 may be capable of deflecting upwards (as described above) or may be constrained to move along a straight path as in the case of the band 56.

Separate constant-torque motors may be provided to drive respectively the bands 56 and 57. The torque setting for each motor may be independently adjustable. For the optimum running condition, for example, the motor driving the band 57 may be set to produce a lower set or maximum torque than the other motor.

We claim:

1. In a cigarette filter attachment machine, means for feeding filter rods comprising a fluted drum for carrying filter rods in the flutes thereof; powered conveyor means arranged to feed a stack-like multi-layer stream of filter rods towards the fluted drum whereby movement of the conveyor means urges the filter rods towards the fluted drum to ensure that filter rods enter the flutes of the fluted drum, at least a part of said conveyor means being disposed at a level below the top of said fluted drum; means defining an expandable area for filter rods above the said part of said conveyor means disposed below the top of the fluted drum and including means upstream of said fluted drum for selectively supporting above the said expandable area a succession of filter-containing trays for feeding filter rods from the trays and onto the conveyor means; and pneumatic feed means for feeding pneumatically-delivered filter rods into the expandable area above the conveyor means adjacent to the end of the conveyor means remote from the fluted drum, whereby the volume of the filter rods expands in the expandable area when filter rods enter the expandable area from the feed means at a rate greater than that at which filter rods are conveyed from the expandable area by the conveyor means.

2. A filter attachment machine according to claim 1, including detecting means for detecting the height of the filter rods in the expandable area and for controlling the operation of said feed means in response thereto.

3. A filter attachment machine according to claim 2, in which the said detecting means is mounted at a level above the level of the upper surface of the stack-like stream which is fed from the expandable area by said conveyor means.

4. A filter attachment machine according to claim 3, in which said feed means is arranged to feed filter rods into the expandable area at an entry level below the minimum level of the upper surface of the filter rods in the expandable area.

5. A filter attachment machine according to claim 1 further including a conveyor band confining the upper surface of the stack-like multi-layer stream of filter rods adjacent to the fluted drum, said conveyor band being arranged to move between two guides between which the conveyor band is capable of deflecting outwardly in response to the pressure of the filter rods and against a restraining force, and including means for detecting when the conveyor band is deflected outwardly to a predetermined extent and for thereupon reducing the speed of the conveyor means.

6. A filter attachment machine according to claim 5 in which the restraining force is produced by a tensioning device for the conveyor band.

7. A filter attachment machine according to claim 6 in which deflection of the conveyor band is indicated by movement of the tensioning device.

* * * * *